United States Patent
Schulze et al.

(10) Patent No.: US 6,836,834 B2
(45) Date of Patent: Dec. 28, 2004

(54) MEMORY CARD HAVING ONE-TIME PROGRAMMABLE MEMORY

(75) Inventors: Paul E. Schulze, Rochester, NY (US); Laurence J. Lobel, Brockport, NY (US)

(73) Assignee: Eastman Kodak Company, Rochester, NY (US)

(*) Notice: Subject to any disclaimer, the term of this patent is extended or adjusted under 35 U.S.C. 154(b) by 0 days.

(21) Appl. No.: 10/713,175

(22) Filed: Nov. 14, 2003

(65) Prior Publication Data

US 2004/0098428 A1 May 20, 2004

Related U.S. Application Data

(63) Continuation of application No. 10/008,546, filed on Nov. 13, 2001, now Pat. No. 6,675,276.

(51) Int. Cl.[7] .......................... G06F 12/08; G06F 12/00
(52) U.S. Cl. ....................................... 711/200; 711/170
(58) Field of Search .................................. 711/200, 170

(56) References Cited

U.S. PATENT DOCUMENTS

| 6,034,882 A | 3/2000 | Johnson et al. |
| 6,185,122 B1 | 2/2001 | Johnson et al. |
| 6,453,383 B1 * | 9/2002 | Stoddard et al. ............ 711/112 |

OTHER PUBLICATIONS

PC Card Standard, Release 2.0, published by the Personal Computer Memory Card international Association, Sunnyvale, California, Sep. 1991.
CompactFlash Specification Version 1.3, published by the CompactFlash Association, Palo Alto, California, Aug. 5, 1998.

* cited by examiner

Primary Examiner—Mano Padmanabhan
Assistant Examiner—Midys Inoa
(74) Attorney, Agent, or Firm—Raymond L. Owens

(57) ABSTRACT

A memory card having a one-time programmable memory which stores a plurality of storage allocation tables and which is compatible with a host device.

6 Claims, 8 Drawing Sheets

MEMORY CARD HAVING ONE-TIME PROGRAMMABLE MEMORY

CROSS REFERENCE TO RELATED APPLICATION

This application is a continuation of U.S. patent application Ser. No. 10/008,546 filed Nov. 13, 2001 now U.S. Pat. No. 6,675,276, entitled "Method for Providing Extensible DOS-FAT System Structures on One-Time Programmable Media", by Schulze et al, the disclosure of which is incorporated herein.

FIELD OF THE INVENTION

The present invention relates to a memory card having a one-time programmable memory.

BACKGROUND OF THE INVENTION

Digital cameras, such as the Kodak DC 4800 camera, capture images of a scene using a solid state image sensor, and store the resulting image data on a solid-state memory card, such as a compact flash card, which uses Flash EPROM memory. The card can be removed from the camera, and inserted into a card reader, so that the images can be transferred from the card to a personal computer. The card can then be erased and reused. The DOS-FAT system is normally used to store and retrieve the image files stored on Flash EPROM memory cards. Unfortunately, the cost of Flash EPROM memory is relatively high, and therefore such erasable memory cards are expensive. Various technologies have been developed to produce write-once memory. One example is described in U.S. Pat. Nos. 6,034,882 and 6,185,122. These write-once memory technologies offer significantly reduced cost, compared to Flash EPROM memory chips.

When personal computers were first introduced, a disc operating system or DOS was needed to access data from floppy discs and hard drives. This platform became ubiquitous and subsequent advancements on disc operating system still maintained backwards compatibility. With the advent of new devices such as removable memory cards, the most compatible method with existing host systems that already have DOS, was to make the device's file system compatible with the DOS file structure commonly known as the FAT file system. The FAT system is documented in ISO/IEC 9293, "Information technology-Volume and file structure of disk cartridges for information interchange".

DOS's structure includes a boot record, which is 1 sector (512 bytes) long, 2 File Allocation Tables (original and a back up FAT), a root directory, and the user data area. The FAT's size is determined by an algorithm as a function of the number of sectors on the medium, the number of entries in the root directory amongst other variables. The number of entries in the FAT is equal to the number of clusters on the storage device.

Each entry in the FAT is either 12, 16, or 32 bits depending on the format of the volume. Since each entry represents the location of a segment of a file, the number of maximum addressable space or cluster is $2^{12}, 2^{16}$, or $2^{32}$. Each cluster can be even binary multiples of sectors.

The root directory following the FAT contains the names of the files or folders and has a pointer to the first cluster of the named file or folder. The root directory consists of entries of 32 bytes for each file name and the number of the first cluster associated with the file. The remainder of the unused directory space is filled with 0's.

At the same time, the FAT file system updates a FAT entry at an offset equal to the starting cluster of the file. The content of the entry is either all 1's to indicate the last cluster used by the file or a non-zero number to indicate the cluster location of the next portion of the file or folder. With this technique, the FAT maps the cluster location of any particular file or folder. Again the last cluster used by a file or folder is indicated by all 1's. A FAT entry with all 0's would indicate a free cluster to be allocated.

In a write-once memory card to be used in a digital camera, it is very desirable to have the card be FAT compatible. This way, a memory card can be recognized as a drive by any hosts that are compatible with the FAT file system. In these write-once devices, the normal storage states are represented by 1's. In rewritable systems, the 1's are converted to 0's in the FAT to indicate free cluster space, and programmed back to patterns of 1's and 0's to represent the file cluster locations. However, this approach presents a serious problem when applied to write-once devices. In write-once or one-time programmable devices that have an unprogrammed state of 1's, the entire FAT and root directory must be written at once to program the file cluster locations and to zero out the 1's in the unallocated clusters and unused space. The FAT and root directory therefore can only be programmed once.

In addition, in write-once or one-time programmable devices that have an unprogrammed state of 1's, the entire FAT and root directory must be written at once if any of the previously written data need to be modified. The FAT and root directory can never be overwritten. As a result, moving a file presents a problem, since if a file is moved, new FAT clusters need to be allocated and the old ones zeroed out so they are available. Similarly, renaming a file presents a problem, since the root directory 32 byte entry for this file name needs to change. Deleting a file presents a problem, since the root directory 32 byte entry for this file name needs to change and the FAT clusters need to be zeroed out.

Some optical disc recording technologies, such as CD-R (recordable compact disc) are one-time programmable (OTP), so that once an area of the disc has been recorded, it cannot be erased. In order to record files on such a CD-R, a special software driver is required. The driver resides on the host computer, in order to convert the non-DOS file system used by the CD-R into a format, which appears to be DOS, to application software running on the host computer. Unfortunately, this requires each host computer to have a special software driver to support the non-DOS file system.

SUMMARY OF THE INVENTION

It is an object of the present invention to provide an improved memory card for revising and retrieving data files stored on a one-time programmable memory.

Another object of the present invention is to provide a memory card that enables OTP media, particularly OTP solid state memory, to appear as a DOS compatible disk drive to the host computer.

These objects are achieved by a memory card for use with a host device, comprising:

a) a one-time programmable memory having locations for storing a plurality of storage allocation tables, data files identified by the storage allocation tables, and a translation table; and b) a controller for enabling the host device to access the one-time programmable memory and to modify the data files, wherein the controller:

i) stores initial data files, a first storage allocation table, and an initial translation table in the one-time programmable memory;

ii) accesses the translation table in the one-time programmable memory to identify the physical location of the first storage allocation table and returns such storage allocation table to the host device for subsequent accessing of the initial data files, iii) nables the host device to modify at least one of the initial data files iv) stores a second storage allocation table, different from the first storage allocation table, in the one-time programmable memory to enable the host device to access the modified data files;

v) amends the translation table to indicate the location of the second storage allocation table, wherein the amended traslation table includes a plurality of entries with the latest entry corrseponding to the location of the latest storage allocation table in the one-time programmable memory, and the latest entry is the latest noninitialized entry; and vi) accesses the amended translator table to identify the physical location of the second storage allocation table and returning such second storage allocation table to the host device to enable access of the modified data files.

It is an advantage of the present invention that a memory card having one-time programmable memory can be continuously compatible with a host device accessing said cards using the DOS-FAT file system, even if some of the files on the memory card are deleted, renamed, or moved.

DETAILED DESCRIPTION OF THE INVENTION

The term FAT is an acronym for file allocation table, which is a form of storage allocation table. Storage allocation tables are disk data structures that catalog the used and unused space on a volume. FAT is a term used for the storage allocation tables in a DOS file system. DOS stands for "disk operating system", originally developed by IBM, Corp, and is currently supplied by Microsoft Corp, Redmond Wash., as MS-DOS. DOS-FATs catalog all available non-defective sectors in a single table by using special attribute bits to mark defective (unusable) sectors. Storage allocation tables are known by other names in other computer systems. Examples of this include the Macintosh file system from Apple Computer, which calls their storage allocation tables "Cluster Allocation Tables" (CATs). The Apple Macintosh system uses two independent tables, known as CATs and LCATs (for "Lockout Cluster Allocation Table"). Regardless of the names given to these structures, the purpose and basic function is identical.

Figure 1:
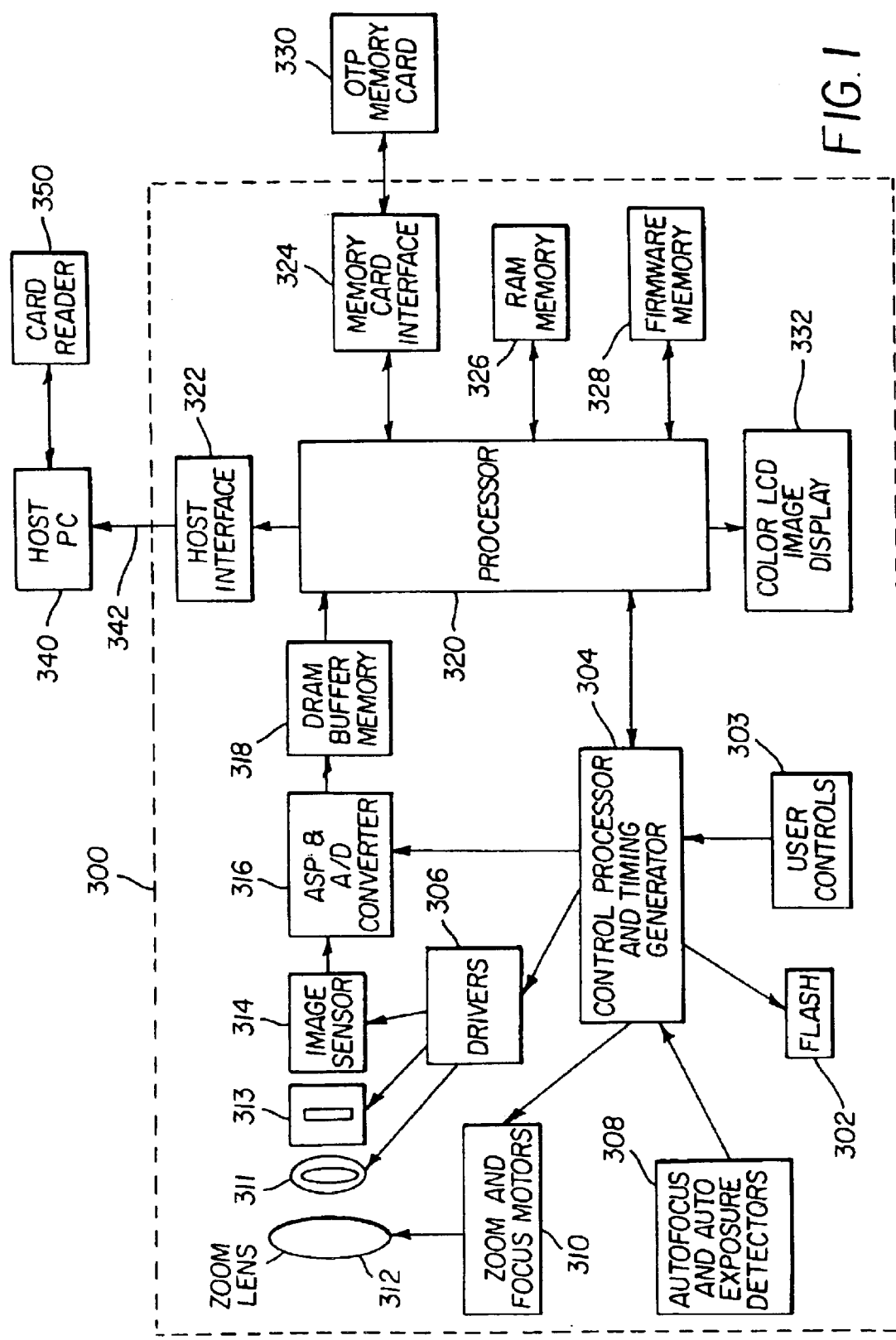
FIG. 1 is a block diagram of a digital photography system, including a digital camera, a host computer, and a one-time programmable removable memory card.

FIG. 1 is a block diagram of a digital photography system that can be used to implement the methods of the present invention. The system includes a digital camera 300 which produces digital images that are stored on the OTP memory card 330. The images are then transferred to a host PC 340 using a card reader 350 or an interface cable 342.

The digital camera 300 includes a zoom lens 312 having zoom and focus motor drives 310 and an electrically adjustable aperture 311 and an electrically driven mechanical shutter 313. The zoom lens 312 focuses light from a scene (not shown) on an image sensor 314, for example, a single-chip color CCD image sensor, using the well known Bayer color filter pattern. The aperture 311, shutter 313, and image sensor 314 are controlled by drivers 306. The zoom and focus motors 310 and the drivers 306 are controlled by control signals supplied by a control processor and timing generator circuit 304.

The control processor and timing generator 304 receives inputs from autofocus and autoexposure detectors 308 and controls a flash 302. The analog output signal from the image sensor 314 is amplified and converted to digital data by the analog signal processing (ASP) and analog-to-digital (A/D) converter circuit 316. The digital data is stored in a DRAM buffer memory 318 and subsequently processed by a processor 320 controlled by the firmware stored in the firmware memory 328, which can be flash EPROM memory. Alternatively, the processor 320 can be provided by custom circuitry (e.g. by one or more custom integrated circuits [ICs] designed only for use in digital cameras), or by a combination of programmable processor(s) and custom circuits.

The processed digital image file is provided to a memory card interface 324 which stores the digital image file on the OTP memory card 330. The OTP memory card can use many different physical form factors and electrical interconnection standards which are well known to those skilled in the art. For example, the OTP memory card 330 can be adapted to the PCMCIA card interface standard, as described in the PC Card Standard, Release 2.0, published by the Personal Computer Memory Card international Association, Sunnyvale, Calif., September 1991, or to the *CompactFlash Specification Version* 1.3, published by the CompactFlash Association, Palo Alto, Calif., Aug. 5, 1998. Other types of removable memory cards, including Smart Memory cards, Secure Digital (SD) cards, and Memory Stick cards could alternatively be used to store the digital images.

The processor 320 performs color interpolation followed by color and tone correction in order to produce rendered sRGB image data. The rendered sRGB image data is then JPEG compressed and stored as a JPEG image file on the OTP memory card 330. The processor 320 also creates a "thumbnail" size image that is stored in RAM memory 326 and supplied to the color LCD image display 332, which displays the captured image for the user to review. The digital camera 300 is controlled by user controls 303, such as a series of user buttons including a shutter release (e.g., capture button) (not shown) which initiates a picture taking operation.

After a series of images have been taken and stored on the OTP memory card 330, the card can be inserted into the card reader 350 attached to the host PC 340. Alternatively, an interface cable 342 can be used to connect between the host interface 322 in the digital camera 300 and the host PC 340. The interface cable 342 can conform to, for example, the well-known IEEE 1394 interface specification, the universal serial bus (USB) interface specification, or other wired or wireless interface specifications.

Figure 2:
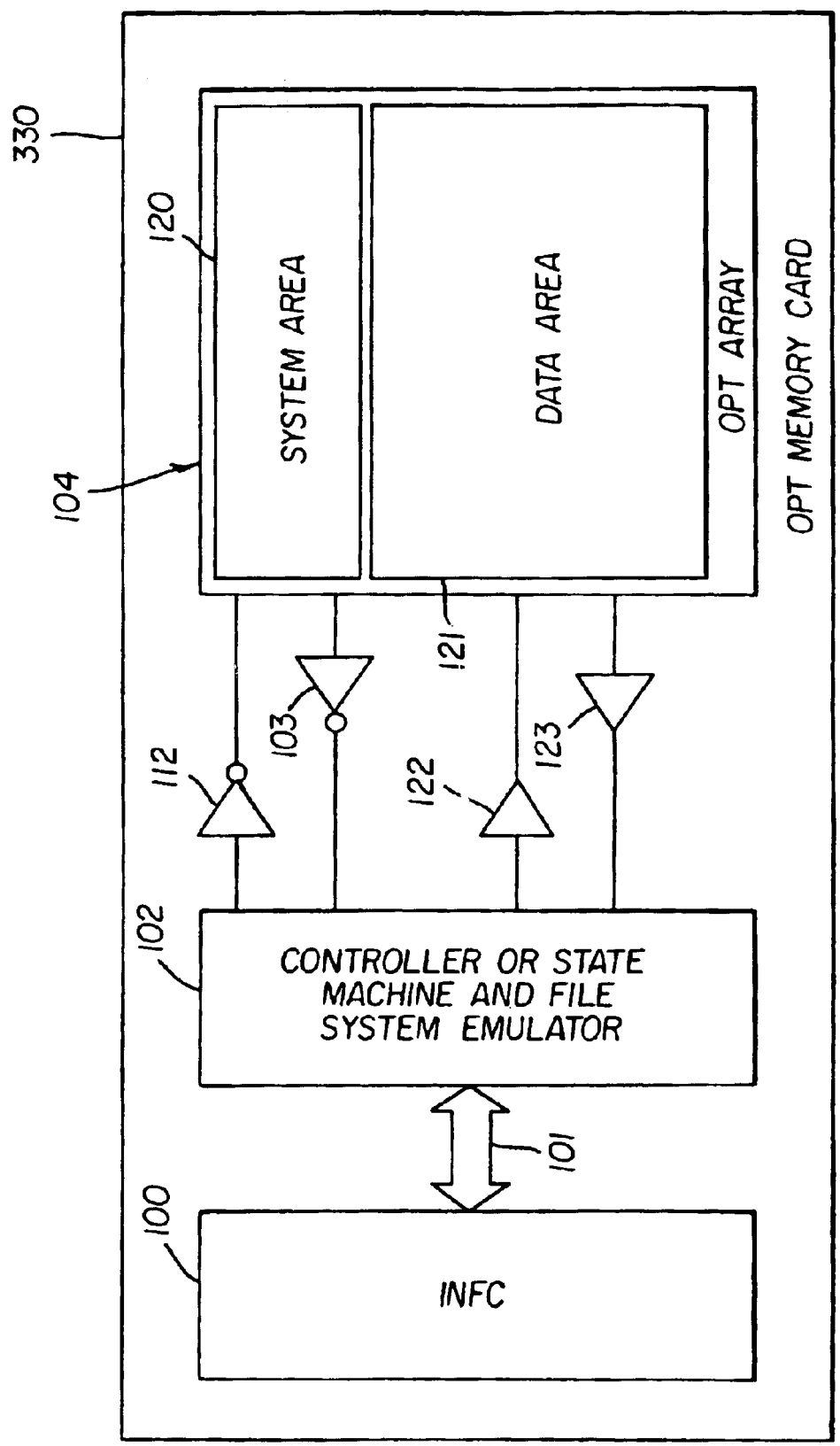
FIG. 2 is a block diagram of a one-time programmable removable memory card.

FIG. 2 is a diagram of an OTP memory card 330. The card interface 100 matches the hardware and software protocol in use between the host and the card. Examples are USB, ATA, PCMCIA, IEEE1394, MMC, SD, etc. The card interface 100 is electrically connected to a controller 102 using card internal host interface to controller interface bus 101. The controller 102 is electrically connected to the OTP memory array 104. The OTP memory array 104 can utilize many different technologies to record data. Preferred embodiments include the vertically stacked field programmable nonvolatile memory technology described in U.S. Pat. Nos. 6,034,882 and 6,185,122. The memory cells used in this technology have an unprogrammed logic state of "one" (1). However, the DOS-FAT file system requires that unused storage space have a logic state of "zero" (0).

In order to utilize memory technology having an unprogrammed state of "one" with a DOS-FAT file system and retain unused space for future use, the present invention uses inverters between the controller 102 and the OTP memory array 104 to invert at least some of the data stored in the OTP memory array 104. The OTP memory array 104 stores both system data, including the storage allocation table, in system area 120, and user data files, such as image files captured by the digital camera 300, in data area 121. In some embodiments of the present invention, all of the data recorded in OTP memory array 104, including both the data recorded in system area 120 and data area 121, is inverted. In other embodiments, only the data recorded in system area 120 is inverted.

In the embodiment shown in FIG. 2, inverters 112 invert the data as it is written to the system area 120 of the OTP memory array 104, and inverters 103 invert the data as it is read from the system area 120 of the OTP memory array 104. When data is written to data area 121, non-inverting drivers 122 and 123 are used so that the data is not inverted. It will be understood that the inverters 103 and 112 can be physical logic circuits included in controller 102. Since there are normally multiple data lines (e.g. 8, 16, or 32 data lines), there are normally multiple parallel inverters represented by inverters 103 and 112. Alternatively, the inversion can be performed by the host device as it transfers data to the OTP memory card 330. For example, the processor 320 in the digital camera 300 can perform the inversion as it transfers the system data through the memory card interface 324.

The inversion performed by inverters 103 and 112 take advantage of the fact that the unprogrammed state of an OTP memory array is all logic ones. By using the inverters 103 and 112, the unprogrammed state becomes all zeros. This means that unused space in the system structures, such as the FATs and ROOT DIR, can be appended to since unused space in them is zeros. This would be impossible if the unprogrammed state was logic ones. The inversion occurs before the physical programming of the individual memory bits. With the FAT appearing to be all zeros, a file can be appended or a new file can be written without having to write out the entire FAT. Any non-used FAT entry will still have all 0's, which represents an available cluster to the FAT file system. As a result, the FAT can be appended to until all the clusters are used up.

Depending on how the data recorded in the system area 120 is inverted, it may be preferable to permit the inversion of data recorded in the data area 121. This eliminates the need to provide separate inverting and non-inverting data paths to the OTP memory array 104.

Figure 3:
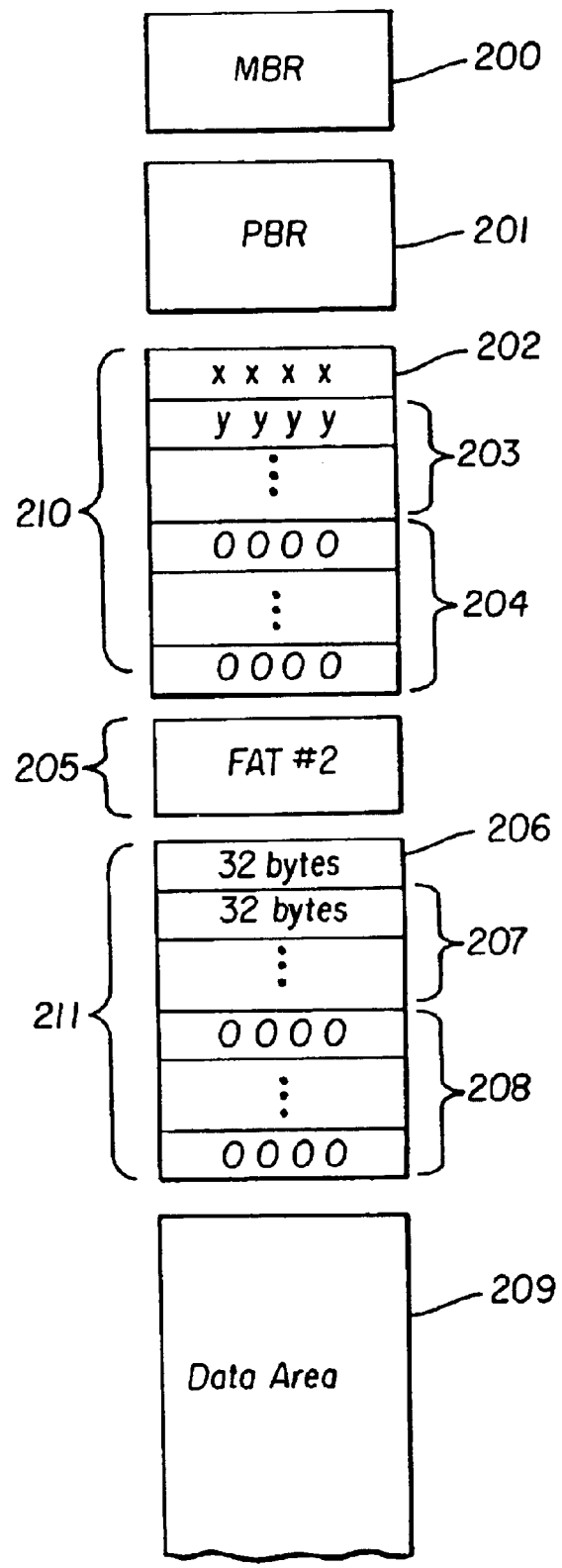
FIG. 3 is a diagram of a first embodiment of a FAT compatible disk structure.

FIG. 3 is a diagram of a FAT compatible disk structure that can be used to define the location of images stored on the OTP memory card 330. FIG. 3 details the types of information stored in OTP memory array 104. The system information used for the DOS-FAT file system includes a master block record (MBR) 200, a partition block record (PBR) 201, a primary FAT 210, a copy of the primary FAT 205, and a root directory (ROOT DIR) 211. All of the system information is stored in system area 120 of OTP memory array 104. The data, such as image data files provided by the digital camera 300, is stored in data area 121 of OTP memory array 104.

The master block record (MBR) 200 describes how many different partitions exist on the volume represented by the OTP memory card 330. The partition block record (PBR) 201 describes the format of the partitions listed in MRB 200. The primary FAT 210 catalogs the location of storage allocation units. For example, entry 202 provides the number of the first cluster allocated to a file, such as an image file provided by digital camera 300. Entry 203 represents additional clusters allocated to files stored in OTP memory array 104. It will be understood by those skilled in the art that a FAT table includes many entries which provide the clusters used to store a plurality of files, such as image files, using the DOS-FAT file system. The primary FAT 210 also includes unallocated FAT entries (free space) 204. The unallocated entries are used when new files are written to the OTP memory card 330, for example when new images are captured and stored.

The DOS-FAT file system conventionally uses a duplicate copy of the primary FAT. This is done so that if the primary FAT is corrupted, as a result of memory errors, the data 209 can still be recovered by using the duplicate copy of the primary FAT. As show in FIG. 3, a duplicate copy of the primary FAT 205 (sometimes called FAT #2 in the literature) provides a duplicate copy of all of the entries in primary FAT 210.

The system area 120 also stores the information in the root directory 211. This information includes a 32 byte individual file entry 206 and many additional entries 207. The root directory 211 also includes unallocated directory entries (free space) 208, which will be used when new image files are added to the OTP memory card 330.

Since the unallocated memory cells 204 of primary FAT 210, the unallocated memory cells (not shown) of the copy of the primary FAT 205, and the unallocated memory cells 208 of the root directory 211, all have a logical state of 0, corresponding to an unprogrammed state of 1, it is possible to append new information in these areas.

The data space is stored in the data area 209 of OTP memory card 330. Since data, such as image data provided by digital camera 300, does not have predictable state of 1 or 0, it is not necessary to invert this data. Therefore, the information recorded in data area 209 can either be inverted or not inverted, in various embodiments.

When the OTP memory card 330 is formatted to provide a DOS-FAT file system, the formatting program calculates the size of the system area 120 needed to catalog the data area 209.

Figure 4:
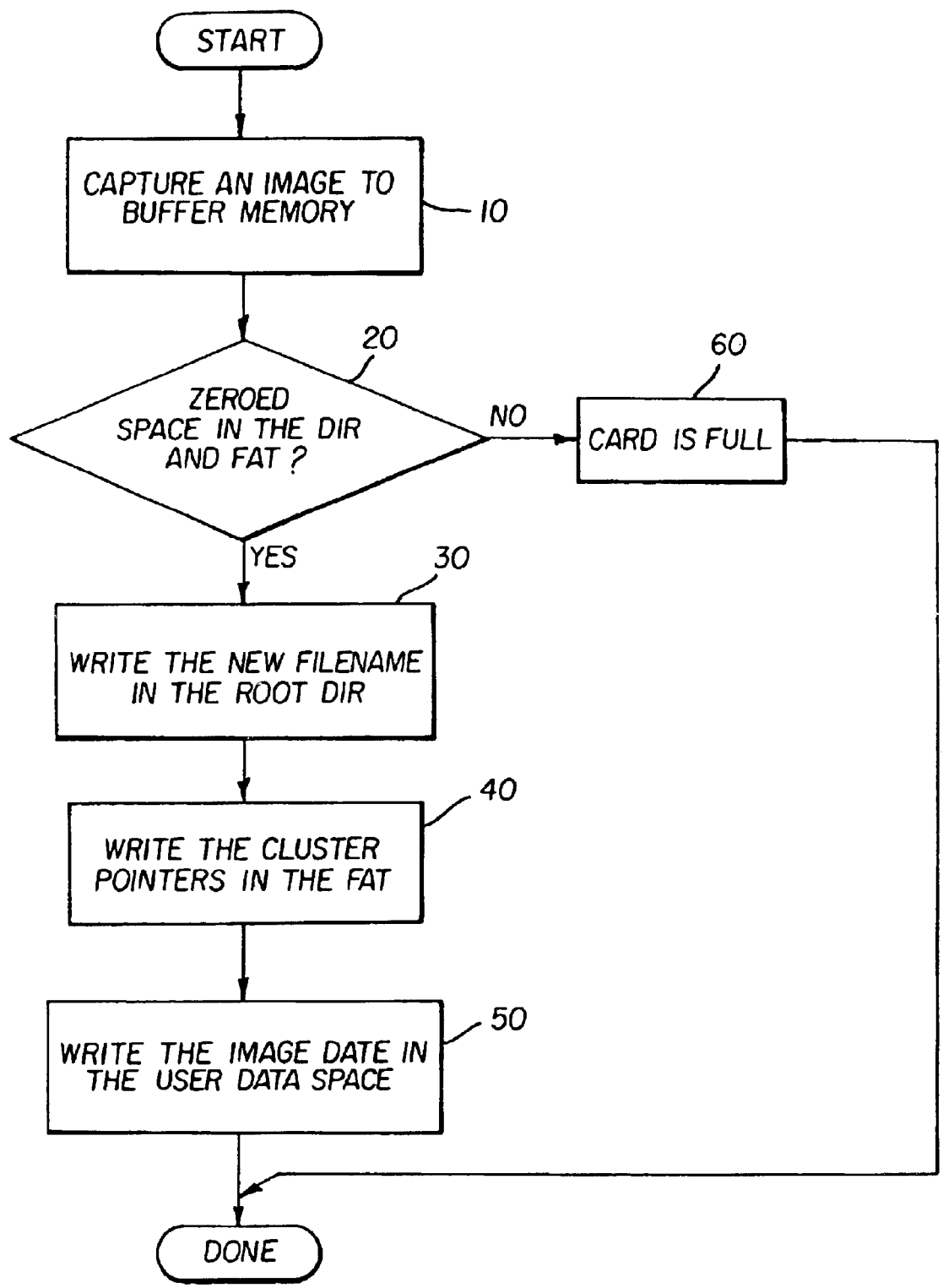
FIG. 4 is a flow diagram of a method for providing an extensible DOS-FAT system structures on one-time programmable media.

FIG. 4 depicts a flow diagram of a method for providing an extensible DOS-FAT system structures on one-time programmable media. This method allows the digital camera 300 to capture a plurality of digital images and store the image files using OTP memory card 330. As new digital images are captured, the processor 320 in the digital camera 300 updates the primary FAT 210, the duplicate FAT 205, and the root directory 211 in order to provide the name and location of the newly stored image files in data area 209.

In block 10, a digital image is captured by digital camera 300, temporarily stored in DRAM buffer memory 318, and processed by processor 320 to create a digital image file which will be stored using OTP memory card 330. In block 20, the controller 102 on the OTP memory card 330 reads the system area 120 of OTP memory array 104 to determine if there is unallocated (e.g. "zeroed") space in the primary FAT 210 and root directory 211 of the system area 120. In block 60, if there is no unallocated space, the controller 102 reports a "card is full" message to the processor 320 in the digital camera 300, which can provide a suitable message to the user on color LCD image display 332. In block 30, if there is unallocated space, the filename of the newly captured image file is appended (written) to the root directory 211 by writing the first empty (unallocated) directory entry. This is done by changing the 0s of the unallocated directory entry to the new file information. In block 40, the primary FAT 210 is appended by writing the cluster pointers in the FAT. These cluster pointers provide the number of the clusters in the data area that will be used to store the newly captured image file. The same information is written to the copy of the primary FAT 205. In block 50, the image data itself is written to the data area 209 of the OTP memory card 330.

As long as the file name or attributes remain unchanged, it is possible to continuously append data at the end of the FAT, using the method of FIG. 4. However, if files are deleted, renamed, or moved, an entire new FAT must be created. This can be accomplished using a second embodiment of a DOS compatible FAT file system, as will now be described in reference to FIGS. 5–8.

Figure 5:
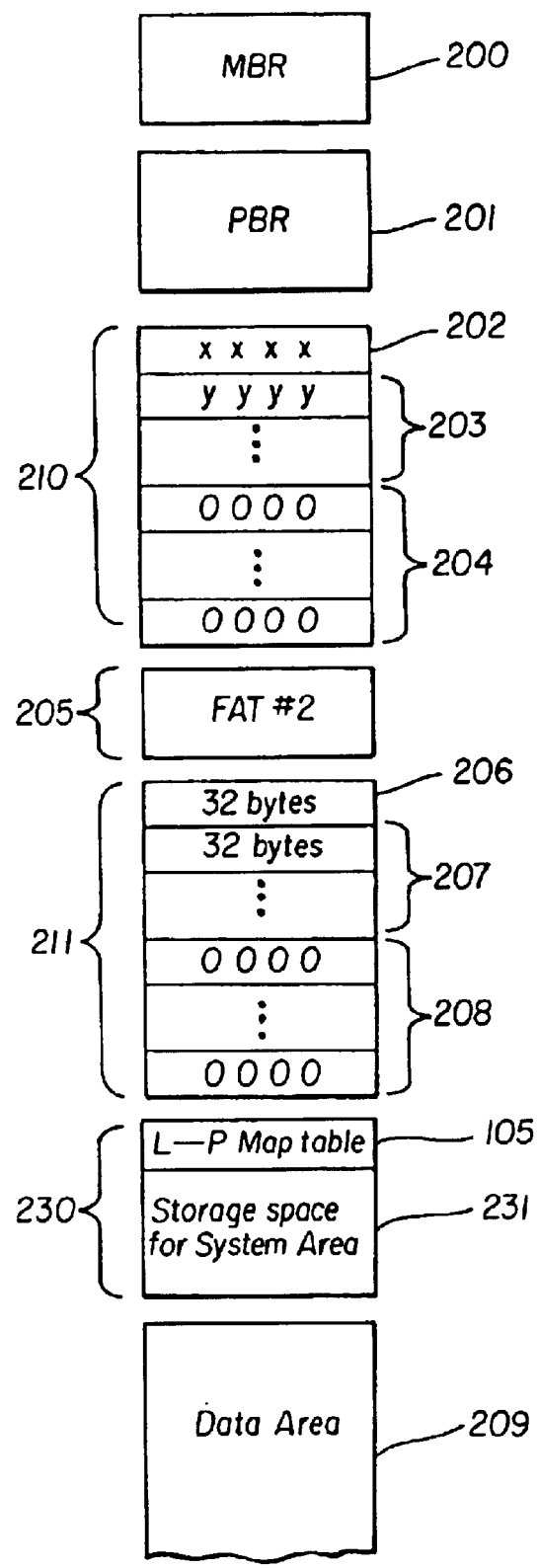
FIG. 5 is a diagram of a second embodiment of a FAT compatible disk structure.

FIG. 5 is a diagram of a second embodiment of a FAT compatible disk structure that can be used to define the location of images stored on the OTP memory card 330. FIG. 5 is similar to FIG. 3, except that it includes a remapping area 230. The remapping area 230 includes a logical to physical mapping table 105 and a revised system area 231. The revised system area 231 is used to provide revised FAT and root directory information. As files are deleted, renamed, or moved, new FAT and root directories must be created to replace the obsolete FAT and Root directories, since the old FAT and Root directories contain the previous state of the DOS volume, having obsolete filename information. Each new generation of FAT and root directories defines a new system area. Thus, the revised system area 231 can include many obsolete FAT and root directories, corresponding to many previous generations of FAT and root directories, as the images stored on the OTP memory card 330 are deleted, renamed, etc. The logical to physical mapping table 105 indicates the location of the currently valid FAT and root directories, thus indicating the location of the current system area, which provides the current state of the storage volume provided by OTP memory card 330.

Figure 6:
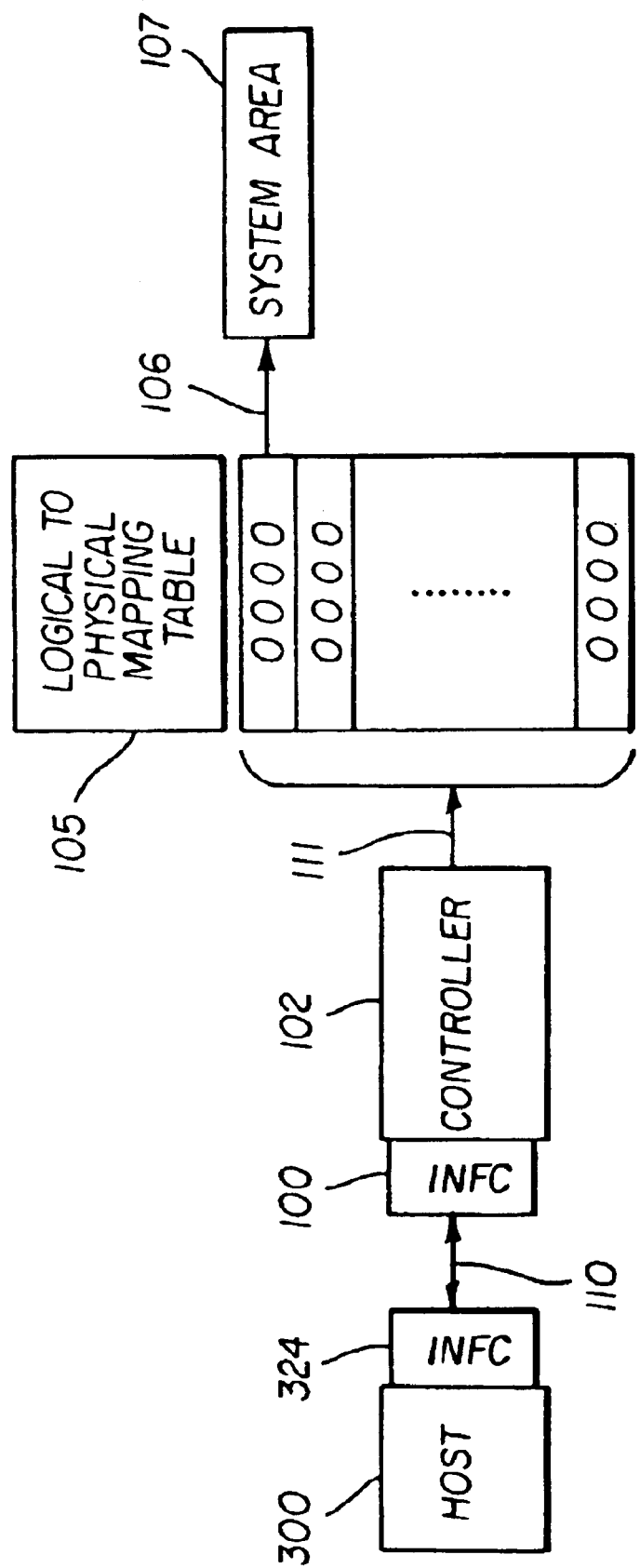
FIG. 6 is a diagram of a single system area before a new mapping is required.

FIG. 6 is a diagram depicting how a host digital camera 300 can determine what files are stored in OTP memory card 330. The memory card interface 324 in the host digital camera 300 uses a host/OTP card protocol 110 such as PCMCIA-ATA to communicate with the OTP card interface 100, which connects to, or is part of, a controller 102. The controller 102 on the OTP memory card 330 maintains an index pointer 111 into an array of pointers provided as a logical to physical mapping table 105. The logical to physical mapping table 105 is a table with entries for each system area, with the index pointer 111 pointing to the location of the current system area.

The first time the OTP memory card 330 is used, the system area 120 stores a primary FAT 210, a copy of the primary FAT 205, and the ROOT DIR 211. The controller 102 indexes to the zero-eth location in logical to physical mapping table 105. Pointer 106 in the table thus point to the first system area, shown as system area 107 in FIG. 6.

Figure 7:
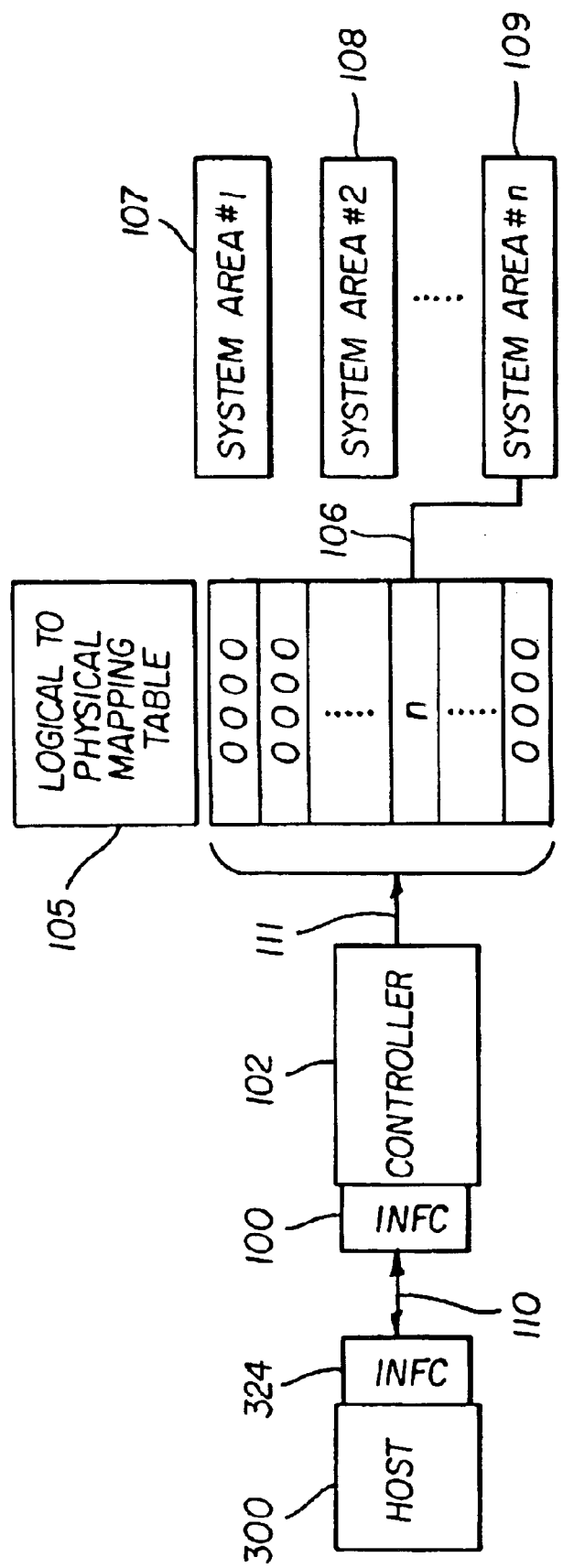
FIG. 7 is a diagram of a multiple system area after mapping.

FIG. 7 is a diagram depicting multiple system areas after remapping. As described earlier, as long as the file name or attributes remain unchanged, it is possible to continuously append data at the end of the FAT, using the method of FIG. 4. However, if files are deleted, renamed, or moved, an entire new FAT must be created. In FIG. 7, controller 102 on OTP memory card 330 has created new system areas (e.g. system area #2 108 and system area #n 109, consisting of new FAT and ROOT DIR areas, because a non-zero entry in the earlier system area (e.g. system area #1 107) had to be modified, which is not possible using OTP memory when the OTP memory has a logical state of ones. The index pointer 111 now indexes further into the logical to physical mapping table 105. The logical to physical mapping table 105 provides a pointer 106, with a value of "n" in FIG. 7, which points to the latest generation system area, which is system area #n 109. The latest generation system area #n 109 provides the current system information, including the current file names of all undeleted files stored in OTP memory card 330.

Figure 8:
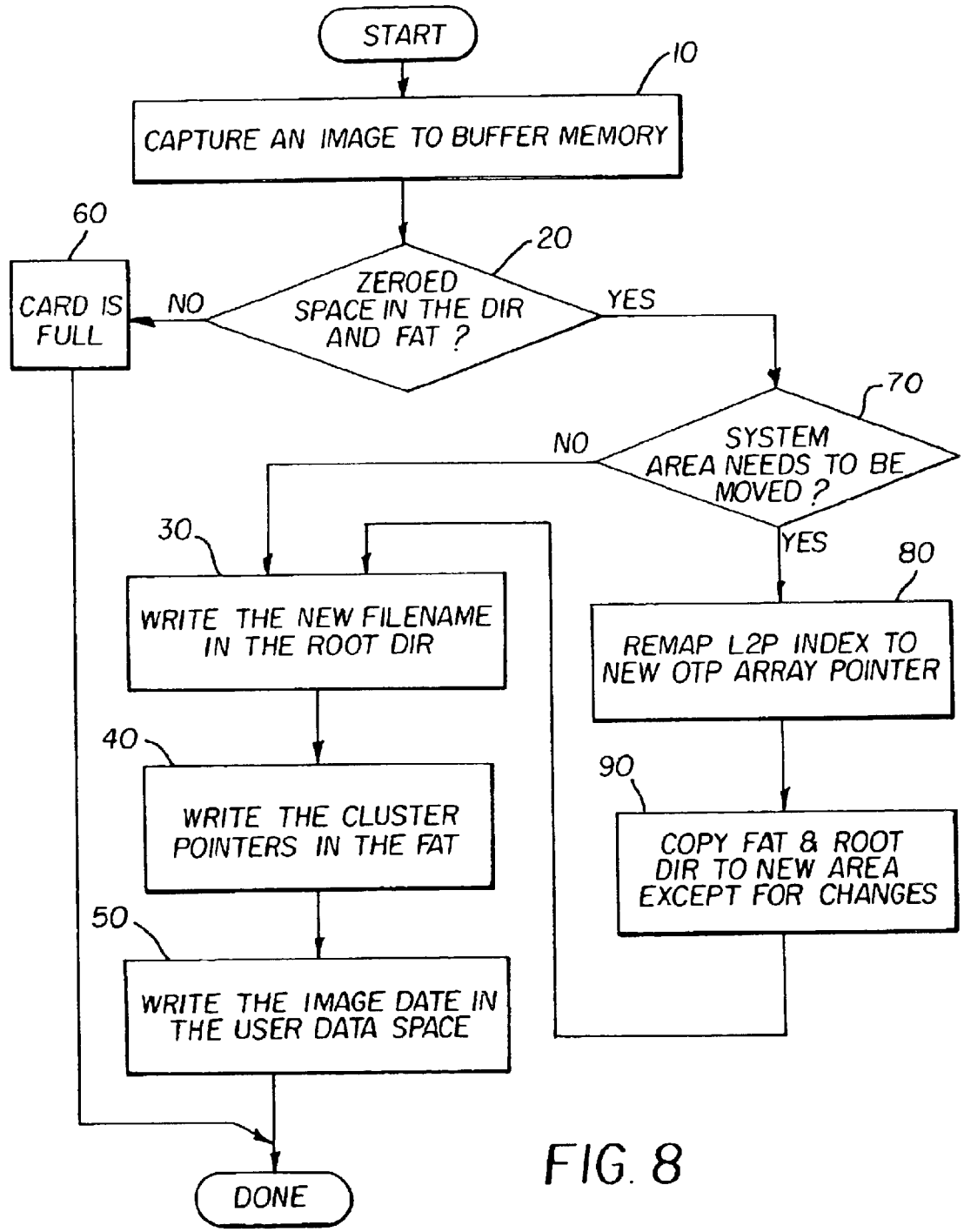
FIG. 8 is a flow diagram of a method for providing logical to physical mapping of a DOS-FAT file system on one-time programmable media.

FIG. 8 is a flow diagram of a method for providing logical to physical mapping of a DOS-FAT file system on one-time programmable media.

As shown in FIG. 8, in block 10, a digital image is captured to camera memory prior to writing the image to the OTP card. In block 20, the controller 102 on the OTP memory card 330 tests to ensure that there is unused "zeroed" space in the current active system area (FAT & DIR).

If there is space, in block 70 an additional test is performed to see if the file being written to the OTP card will cause a change to the existing FAT or ROOT DIR. Examples that will cause such changes include deleting, renaming, and moving files. If a new generation system area is necessary as a result of these operations, in block 80 the controller advances the index into the logical to physical translation table 105 to point to a new generation system area. In block 90, the previous FAT and ROOT DIRs are copied into the new system area, except for the portions that need to be changed.

In blocks 30–40, the FAT and ROOT DIR structures are copied if necessary, and updated as required to reflect any changes (e.g. new files, deleted files) made by the host PC 340 or the digital camera 300. In block 70, if the test determined that a new generation system area was not needed, the current generation system area can be updated. In this case, in block 30 the current generation FAT and ROOT DIR are appended with necessary data indicating that new files have been added, depending on what file operation is in progress. On the other hand, if the test in block 70 determined that a new generation system area is needed, revised versions of the FAT and ROOT DIR are created. In the case of deleted files, the deleted file names are NOT copied to the new area—the deleted file names are simply skipped and the rest of the system area is copied as it was before. In the case of a file being renamed, the new name is substituted for the old name, in the same place within the ROOT DIR as the previous name. In the case of a file being moved to a new subdirectory, the filename must be removed, as in the case of delete, from the ROOT DIR. New ROOT DIR and FAT entries are created. The cluster pointer in the new ROOT DIR directory entry changes to point to the new subdirectory area. The previous files are copied into the new subdirectory, and the moved filename is appended to the ROOT DIR. As described earlier, the image data for any new files is then written to the card in block 50.

In order to make storage allocation tables appear to be mutable on OTP media, the present invention provides a revised storage allocation table at a new physical location on the OTP media. A logical to physical re-mapping table provides the location of the new physical location of the storage allocation table. While this table is preferably stored in the OTP memory, it is possible to store the table using a different type of memory, such as Flash EPROM memory, on the same memory card as the OTP media.

The invention has been described in detail with particular reference to certain preferred embodiments thereof, but it will be understood that variations and modifications can be effected within the spirit and scope of the invention.

PARTS LIST

- 10 block
- 20 block
- 30 block
- 40 block
- 50 block
- 60 block
- 70 block
- 80 block
- 90 block
- 100 OTP card interface
- 101 card internal host interface to controller interface bus
- 102 controller
- 103 data path inverter
- 104 OTP memory array
- 105 logical to physical mapping table
- 106 pointer to current system area
- 107 single system area before remapping
- 108 additional (second) system area after remapping
- 109 Nth system area after multiple remappings
- 110 host/OTP card protocol
- 111 index pointer
- 112 data path inverter
- 120 system area
- 121 data area
- 122 non-inverting data path buffer
- 123 non-inverting data path buffer
- 200 master block record
- 201 partition block record
- 202 single FAT entry
- 203 multiple additional FAT entries
- 204 unallocated FAT entries
- 205 complete copy of primary FAT
- 206 individual file entry
- 297 multiple additional directory entries
- 208 unallocated directory entries
- 209 user data area
- 210 primary FAT
- 211 root directory
- 230 remapping area
- 231 storage space for system areas
- 300 digital camera
- 302 flash
- 303 users controls
- 304 control processor and timing generator circuit
- 306 drivers
- 308 autofocus and autoexposure detectors
- 310 zoom and focus motor drives
- 311 aperture
- 312 zoom lens
- 313 shutter
- 314 image sensor
- 316 analog signal processing and analog-to-digital converter
- 318 DRAM buffer memory
- 320 processor
- 322 host interface
- 324 memory card interface
- 326 RAM memory
- 328 firmware memory
- 330 OTP memory card
- 332 color LCD image display
- 340 host PC
- 342 interface cable
- 350 card reader

What is claimed is:

1. A memory card for use with a host device, comprising:
   a) a one-time programmable memory having locations for storing a plurality of storage allocation tables, data files identified by the storage allocation tables, and a translation table; and
   b) a controller for enabling the host device to access the one-time programmable memory and to modify the data files, wherein the controller:
      i) stores initial data files, a first storage allocation table, and an initial translation table in the one-time programmable memory;
      ii) accesses the translation table in the one-time programmable memory to identify the physical location of the first storage allocation table and returns such storage allocation table to the host device for subsequent accessing of the initial data files,
      iii) enables the host device to modify at least one of the initial data files
      iv) stores a second storage allocation table, different from the first storage allocation table, in the one-time programmable memory to enable the host device to access the modified data files;
      v) amends the translation table to indicate the location of the second storage allocation table, wherein the amended traslation table includes a plurality of entries with the latest entry corrsesponding to the location of the latest storage allocation table in the one-time programmable memory, and the latest entry is the latest noninitialized entry; and
      vi) accesses the amended translator table to identify the physical location of the second storage allocation table and returning such second storage allocation table to the host device to enable access of the modified data files.

2. The memory card of claim 1 wherein the storage allocation tables are file allocation tables.

3. The memory card of claim 1 wherein the data files include images.

4. The memory card of claim 1 wherein the host device is a digital camera.

5. The memory card of claim 1 wherein the host device is a personal computer.

6. The memory card of claim 1 wherein data stored in the storage allocation table is logically inverted as it is written into the one-time programmable memory.

* * * * *